J. L. DODGE.
Horseshoe.

No. 199,422.  Patented Jan. 22, 1878.

WITNESSES:
Henry N. Miller
C. Sedgwick

INVENTOR:
J. L. Dodge
BY Munn & Co
ATTORNEYS.

UNITED STATES PATENT OFFICE.

JASPER L. DODGE, OF GREENE, RHODE ISLAND.

IMPROVEMENT IN HORSESHOES.

Specification forming part of Letters Patent No. 199,422, dated January 22, 1878; application filed December 14, 1877.

*To all whom it may concern:*

Figure 1:
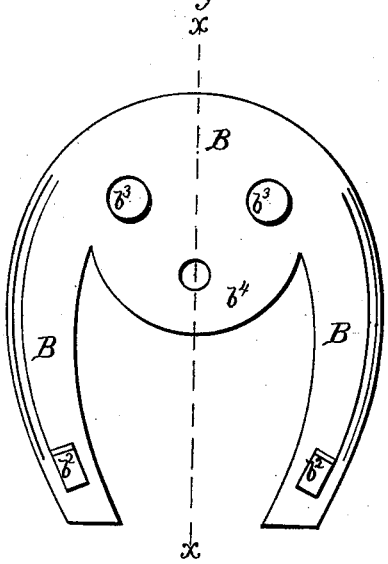
Figure 2:
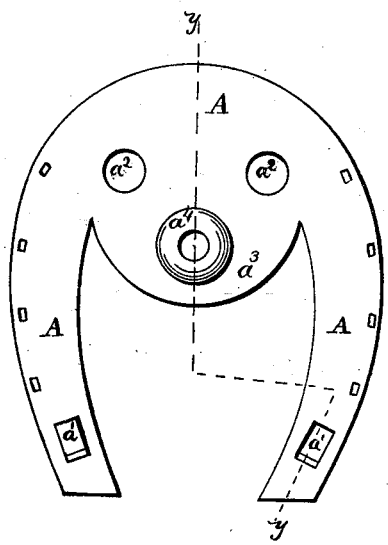
Figure 3:
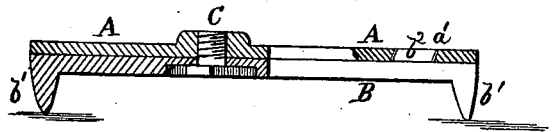

Be it known that I, JASPER LATHAN DODGE, of Greene, in the county of Kent and State of Rhode Island, have invented a new and useful Improvement in Horseshoes, of which the following is a specification:

Figure 1 represents the upper side of the lower part of my improved horseshoe. Fig. 2 represents the upper side of the upper part of the same. Fig. 3 is a detail section of the same, taken through the lines $x\,x$ and $y\,y$, Figs. 1 and 2.

Similar letters of reference indicate corresponding parts.

The object of this invention is to furnish horseshoes which shall be so constructed that they will not "ball" with snow, and that the calks may be easily detached when the horse is put into the stable, so that he cannot injure himself or cut the floor with sharp calks, and the calks can be taken off to be sharpened without taking the horse to a blacksmith's shop, and may be kept sharp by replacing the calks, when worn, by new ones, while the worn ones are taken to the shop to be sharpened.

The invention consists in an improved horseshoe, formed of the upper part, having holes formed through it, and having its forward part filled with a plate, provided with a boss having a screw-hole formed through it, the lower part having grooves to receive the nail-heads, having studs formed upon it, and having its forward part filled with a plate provided with a countersunk hole, and the connecting-screw, as hereinafter fully described.

A represents the upper part of the shoe, which is nailed to the hoof in the usual way. The part A has two beveled holes, $a^1$, formed in its heels, and two straight holes, $a^2$, formed in its forward part. The forward part of the part A is filled with a plate, $a^3$, which has a boss, $a^4$, having a screw-hole made through it, formed upon its upper side to give a firmer hold to the screw.

B is the lower part of the shoe, which is provided with calks $b^1$, in the usual way. The upper side of the part B is so formed as to fit accurately upon the lower side of the part A, and has grooves formed in the side parts of its upper side, to receive the heads of the nails that secure the said part A to the hoof.

Upon the upper side of the heels of the part B are formed inclined or beveled studs $b^2$, to fit into the beveled holes of the part A, and upon its forward part are formed straight studs $b^3$, to fit into the straight holes of the said part A.

The forward part of the part B is filled with a plate, $b^4$, corresponding with the plate $a^3$ of the part A, and which has a hole formed through it corresponding with the screw-hole through the said part A, to receive the screw C, by which the part B is held to the part A, and which is countersunk upon the lower side, so that the head of the screw C cannot project to be in the way.

By this construction the studs $b^2$ $b^3$ receive all the strain, the screw C having nothing to do but hold the two parts together.

By this construction the lower or calk part B can be detached at any time by taking out the screw C.

Having thus described my invention, I claim as new and desire to secure by Letters Patent—

An improved horseshoe, formed of the part A, having holes $a^1$ $a^2$ formed through it, and having its forward part filled with a plate, $a^3$, provided with a boss, $a^4$, having a screw-hole formed through it, the part B, having grooves to receive the nail-heads, having studs $b^2$ $b^3$ formed upon it, and having its forward part filled with a plate, $b^4$, provided with a countersunk hole, and the screw C, substantially as herein shown and described.

JASPER LATHAN DODGE.

Witnesses:
WILLIS C. BATES,
JOHN R. LEWIS.